United States Patent
Yu et al.

(10) Patent No.: US 9,751,516 B2
(45) Date of Patent: Sep. 5, 2017

(54) INFORMATIONAL BASED ENGINE STOP/START SENSITIVITY CONTROL FOR MICRO-HEV

(71) Applicant: Ford Global Technologies, LLC, Dearborn, MI (US)

(72) Inventors: Hai Yu, Canton, MI (US); Johannes Geir Kristinsson, Ann Arbor, MI (US); Ryan Abraham McGee, Shanghai (CN); Mathew Alan Boesch, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 358 days.

(21) Appl. No.: 14/192,034

(22) Filed: Feb. 27, 2014

(65) Prior Publication Data
US 2015/0239450 A1  Aug. 27, 2015

(51) Int. Cl.
*G06F 7/70* (2006.01)
*B60W 10/06* (2006.01)
*B60W 10/18* (2012.01)
*F02N 11/08* (2006.01)

(52) U.S. Cl.
CPC .......... *B60W 10/06* (2013.01); *B60W 10/18* (2013.01); *F02N 11/0822* (2013.01); *F02N 11/0837* (2013.01); *F02N 2200/102* (2013.01); *F02N 2200/125* (2013.01); *F02N 2300/2006* (2013.01); *F02N 2300/2011* (2013.01); *Y02T 10/48* (2013.01)

(58) Field of Classification Search
CPC .... B60W 10/06; B60W 10/18; B60W 10/184; B60T 8/1755; B60T 8/172; B60T 7/22

USPC ............ 701/22, 70; 477/204; 903/946, 930; 180/65.28
See application file for complete search history.

(56) References Cited

U.S. PATENT DOCUMENTS

| | | | | |
|---|---|---|---|---|
| 6,135,920 A * | 10/2000 | Kamiya | ............... | B60W 10/06 |
| | | | | 477/185 |
| 6,308,129 B1 * | 10/2001 | Uchida | ................... | F02D 17/04 |
| | | | | 477/203 |
| 6,415,230 B1 | 7/2002 | Maruko et al. | | |
| 6,571,165 B2 | 5/2003 | Maruko et al. | | |
| 7,516,007 B2 * | 4/2009 | Tamai | ..................... | B60T 7/122 |
| | | | | 701/22 |
| 8,029,074 B2 * | 10/2011 | Cahill | ................... | B60T 8/1703 |
| | | | | 303/122.03 |
| 2007/0073466 A1 * | 3/2007 | Tamai | ..................... | B60T 7/122 |
| | | | | 701/70 |
| 2010/0030434 A1 | 2/2010 | Okabe et al. | | |
| 2010/0049375 A1 | 2/2010 | Tanimoto | | |

(Continued)

OTHER PUBLICATIONS

Naranjo, et al., Intelligent Transportation Systems, IEEE Intelligent Systems, Jan./Feb. 2006, pp. 2-11, "Using Fuzzy Logic in Automated Vehicle Control."

*Primary Examiner* — Shardul Patel
(74) *Attorney, Agent, or Firm* — David B. Kelley; Brooks Kushman P.C.

(57) ABSTRACT

A controller may be configured to adjust a brake apply and release detection calibration based on a detection sensitivity associated with a predicted driver start/stop intention for a vehicle and an associated confidence level indicative of a likelihood of the predicted driver intention; and perform at least one of engine startup and engine shutdown according to the adjusted brake pedal detection calibration.

20 Claims, 5 Drawing Sheets

(56) References Cited

U.S. PATENT DOCUMENTS

| | | |
|---|---|---|
| 2010/0131148 A1 | 5/2010 | Camhi et al. |
| 2010/0241329 A1 | 9/2010 | Fujimura |
| 2011/0071746 A1 | 3/2011 | O'Connor Gibson et al. |
| 2013/0072348 A1* | 3/2013 | Lochocki, Jr. ........ B60W 10/06 477/54 |
| 2013/0158838 A1* | 6/2013 | Yorke ................... B60W 10/06 701/103 |
| 2013/0226378 A1* | 8/2013 | Tate, Jr. .............. F02N 11/0837 701/22 |

\* cited by examiner

| CONFIDENCE LEVEL | | | DRIVER INTENTION | | |
|---|---|---|---|---|---|
| | | | STOP | NORMAL | START |
| HIGH | 7 | | HIGH SLUGGISHNESS | DEFAULT SETTINGS | HIGH PROMPTNESS |
| | 6 | | | | |
| MEDIUM | 5 | | MEDIUM SLUGGISHNESS | DEFAULT SETTINGS | MEDIUM PROMPTNESS |
| | 4 | | | | |
| | 3 | | | | |
| LOW | 2 | | DEFAULT SETTINGS | | |
| | 1 | | | | |

FIG. 4

INFORMATIONAL BASED ENGINE STOP/START SENSITIVITY CONTROL FOR MICRO-HEV

TECHNICAL FIELD

Various embodiments relate to start/stop sensitivity control for hybrid-electric vehicles.

BACKGROUND

A micro-hybrid or stop/start vehicle can selectively turn its engine off during portions of a drive cycle to conserve fuel. As an example, a stop/start vehicle can turn its engine off while the vehicle is stopped rather than allow the engine to idle. The engine can then be restarted, for example, when a driver releases the brake pedal or steps on the accelerator pedal.

SUMMARY

In a first illustrative embodiment, a vehicle includes an engine configured for automatic shutdown and restart; and a controller configured to adjust a brake apply and release detection calibration based on a brake detection sensitivity level associated with a predicted driver start/stop intention for the vehicle and a confidence level indicative of a likelihood of the predicted driver intention, the calibration including a first brake pedal pressure threshold value at which the engine is shutdown, and a second brake pressure threshold value at which the engine is started; and perform at least one of startup of the engine and shutdown of the engine according to the adjusted brake pedal detection calibration.

In a second illustrative embodiment, a method includes adjusting a brake apply and release detection calibration by a vehicle based on a brake detection sensitivity level associated with a predicted driver start/stop intention for the vehicle and a confidence level indicative of a likelihood of the predicted driver intention; and performing at least one of engine startup and engine shutdown according to the adjusted brake pedal detection calibration.

In a third illustrative embodiment, a powertrain control system includes at least one controller configured to adjust a brake apply and release detection calibration based on a brake detection sensitivity level associated with a predicted driver start/stop intention for the vehicle and a confidence level indicative of a likelihood of the predicted driver intention; and perform at least one of engine startup and engine shutdown according to the adjusted brake pedal detection calibration.

BRIEF DESCRIPTION OF THE DRAWINGS

FIG. 4 illustrates an exemplary brake apply and release detection performance decision table.

DETAILED DESCRIPTION

Figure 1:
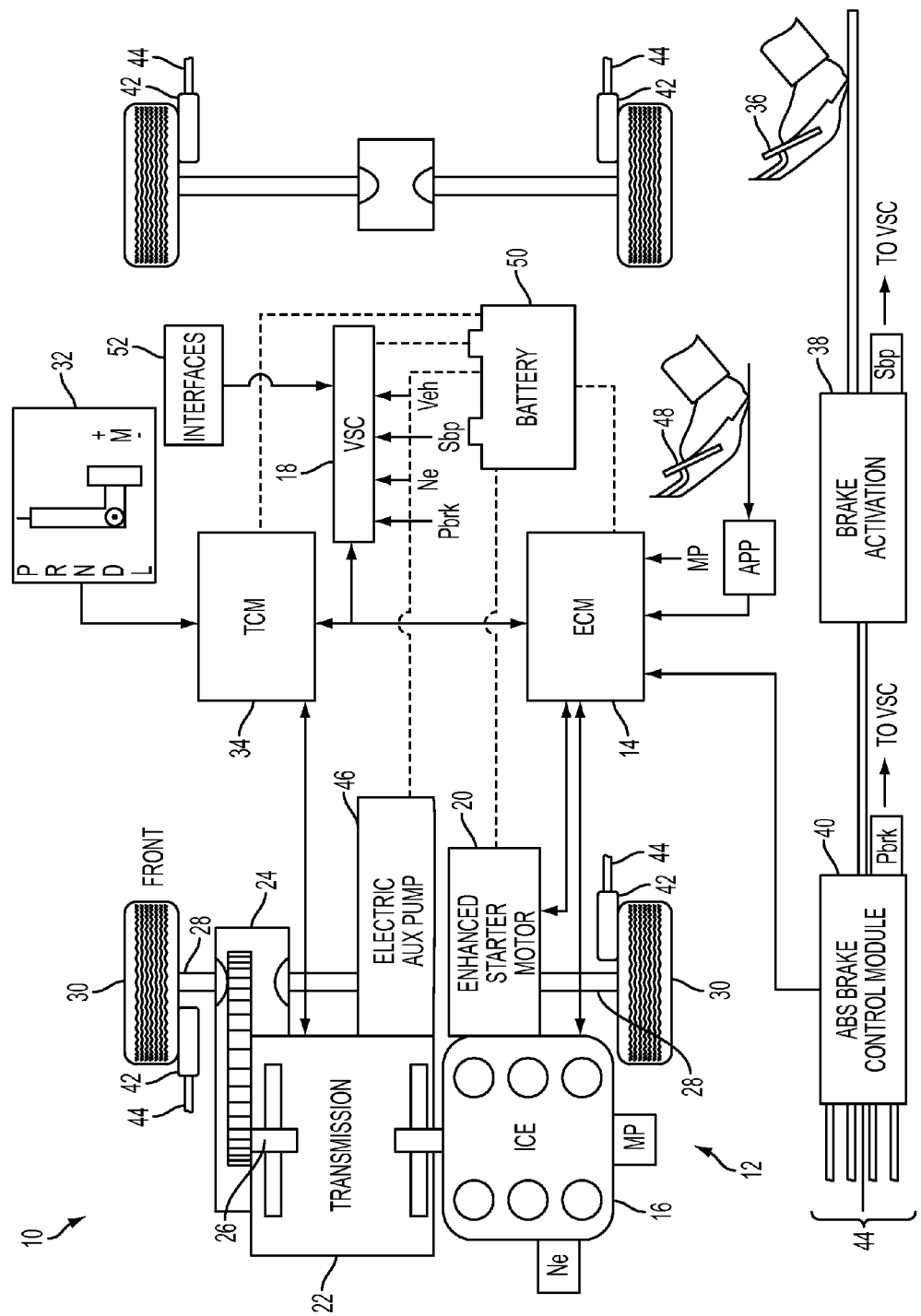
FIG. 1 illustrates an exemplary schematic diagram of a vehicle system for controlling engine shutdown and restart using engine start/stop sensitivity control of brake apply and release detection.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In a micro-hybrid or stop/start vehicle, interpretation of driver power demand intention may be referred to as brake apply and release detection (BARD). BARD is designed to optimize stop/start performance by differentiating between a state in which the driver is not requesting vehicle propulsion, and a state in which the driver is requesting or is about to request vehicle propulsion. By monitoring brake pedal release of a driver of the vehicle, a vehicle controller may implements BARD to determine whether the driver is or is expected to request propulsion torque. Once a brake release state is determined, the stop/start control logic of the controller may be configured to request engine start-up to prepare for vehicle launch and acceleration. It is desirable to utilize the engine shut down function as much and as long as possible when certain engine stop conditions are satisfied to minimize unnecessary fuel consumption. On the other hand, satisfaction of the driver with the stop/start functionality relies on the performance of the start/stop determination, i.e., how quickly the engine can be restarted and how prompt the powertrain is ready to deliver request drive power. Delay or drag in vehicle launch may jeopardize acceptance of the start/stop feature by a driver of the vehicle.

The effects of stop/start functionality on fuel economy and vehicle launch performance places requirements on the BARD function design with respect to robustness and sensitivity. On one hand, sensitive brake release detection may provide prompt vehicle launch performance with minimal or no delay in engine restart. However, excessive sensitivity may trigger unnecessary engine restarts due to noisy driver brake pedal behavior, degrading start/stop fuel economy savings. On the other hand, sluggish brake release detection may delay engine pull-up and vehicle launch, causing the driver to feel a torque hole or drag when requesting a vehicle launch.

A BARD system may utilize brake release detection logic with thresholds on brake pressure and its gradient to characterize driver brake pedal behavior. These thresholds may include a first brake pedal pressure threshold value at which the engine is shutdown or "pulled-down," and a second brake pressure threshold value at which the engine is started or "pulled-up." The thresholds may be calibrated to achieve the customer acceptable performance over a wide range of driving habits and situations. Although driver brake pedal behavior may be a primary source of information with respect to driver launch intention, driver brake pedal behavior alone may be insufficient in determine how quickly and to what extent the driver intends to launch the vehicle. Moreover, involuntary small brake pedal motion may introduce signal noise reducing the certainty and effectiveness of brake release detection based on unified sensitivity setting.

An improved BARD system may introduce new information to the brake apply and release detection to improve the robustness of the start/stop determination. By using information from additional sources than brake pedal input (e.g., sources outside the vehicle such as other vehicles or from road infrastructure, sources within the vehicle such as vehicle cameras, light detection/ranging (LIDAR) subsystems and Sonar, and additional driver inputs to control the sensitivity of brake release detection), the BARD may adjust the brake pedal pressure threshold values to provide a more accurate identification of driver intention with respect to vehicle propulsion demand and launch performance.

With reference to FIG. 1, a vehicle system for controlling engine shutdown and restart based on brake apply and release detection is illustrated in accordance with one or more embodiments and is generally referenced by numeral 10. The vehicle system 10 is depicted within a vehicle 12. The vehicle system 10 includes a controller, such as an engine control module (ECM) 14, an internal combustion engine (ICE) 16 and a vehicle system controller (VSC) 18 that are in communication with each other. The VSC 18 receives input that corresponds to brake system characteristics and communicates with the ECM 14 to control the shutdown and restart of the engine 16.

The illustrated embodiment depicts the vehicle 12 as a micro-hybrid vehicle, which is a vehicle that is propelled by the engine 16, and the engine 16 is repeatedly started and stopped to conserve fuel. An enhanced starter motor 20 is coupled to an engine crankshaft. The starter motor 20 receives electrical power and provides output torque to the crankshaft for starting the engine 16.

The vehicle 12 includes a transmission 22 for adjusting the output torque of the engine 16. Torque from the engine 16 is transferred through the transmission 22 to a differential 24 by a transmission output shaft 26. Axle half shafts 28 extend from the differential 24 to a pair of driven wheels 30 to provide drive torque for propelling the vehicle 12.

The vehicle 12 includes a shifter 32 for manually selecting a transmission gear. The shifter 32 includes a sensor (not shown) for providing an output signal that corresponds to a selected transmission gear (e.g., PRNDL). A transmission control module (TCM) 34 communicates with the shifter 32 and the transmission 22 for adjusting the transmission gear ratio based on the shifter selection. Alternatively the shifter 32 may be mechanically connected to the transmission 22 for adjusting the transmission gear ratio.

The vehicle 12 includes a braking system which includes a brake pedal 36, and a booster and a master cylinder which are generally referenced by brake activation block 38 in FIG. 1. The braking system also includes an ABS brake control module 40 that is connected to wheel brake assemblies 42 and the brake activation block 38 by a series of hydraulic lines 44 to effect friction braking. The wheel brake assemblies 42 are oriented at each wheel 30 and may be configured as caliper, or drum brake assemblies.

The braking system also includes sensors for providing information that corresponds to current brake characteristics. The braking system includes a position switch for providing a brake pedal state ($S_{bp}$) signal that corresponds to a brake pedal position (e.g., applied or released). In other embodiments, the braking system includes a position sensor (not shown) for measuring pedal position. The braking system also includes one or more sensors for providing output indicative of a braking effort or brake torque. In one or more embodiments the brake torque may be derived from another sensor measurement. In the illustrated embodiment, the sensors include pressure sensors for providing a brake pressure ($P_{brk}$) signal that corresponds to an actual brake pressure value within the brake system (e.g., brake line pressure or master cylinder pressure).

The vehicle 12 includes an accelerator pedal 48 with a position sensor for providing an accelerator pedal position (APP) signal that corresponds to a driver request for propulsion. The ECM 14 controls the throttle of the engine 16 based on the APP signal.

The vehicle 12 includes an energy storage device, such as a battery 50. The battery 50 supplies electrical energy to the vehicle controllers, and the starter motor 20, as generally indicated by dashed lines in FIG. 1. The vehicle 12 may include a single battery 50, such as a conventional low voltage battery, or multiple batteries, including a high voltage battery. Additionally, the vehicle 12 may include other types of energy storage devices, such as capacitors or fuel cells.

The VSC 18 communicates with other vehicle systems, sensors and controllers for coordinating their function. As shown in the illustrated embodiment, the VSC 18 receives a plurality of input signals (e.g., $S_{bp}$, $P_{brk}$, engine speed (Ne), vehicle speed, (Veh), steering wheel position, turning signal activation, etc.) from various vehicle sensors. Moreover, the VSC 18 also includes one or more interfaces 52 to receive additional information from sources external to the vehicle 12, such as information from infrastructure (e.g., vehicle to vehicle (V2V)/vehicle to infrastructure (V2I)), vehicle sensors (e.g., cameras, light detection and ranging (LIDAR), Sonar, etc.).

Although it is shown as a single controller, the VSC 18 may include multiple controllers that may be used to control multiple vehicle systems according to an overall vehicle control logic, or software. The vehicle controllers, including the VSC 18 generally include any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 18 communicates with other vehicle systems and controllers (e.g., the ECM 14, the TCM 34, etc.) over one or more wired or wireless vehicle connections using common bus protocols (e.g., CAN and LIN).

The VSC 18 communicates with the ECM 14 to control the shutdown and restart of the engine 16 based on input signals that correspond to brake apply and release conditions. The vehicle system 10 anticipates a vehicle launch event based on brake release conditions. By shutting down the engine 16 when vehicle propulsion is not needed, a micro-hybrid has improved fuel economy as compared to a conventional vehicle.

Figure 2:
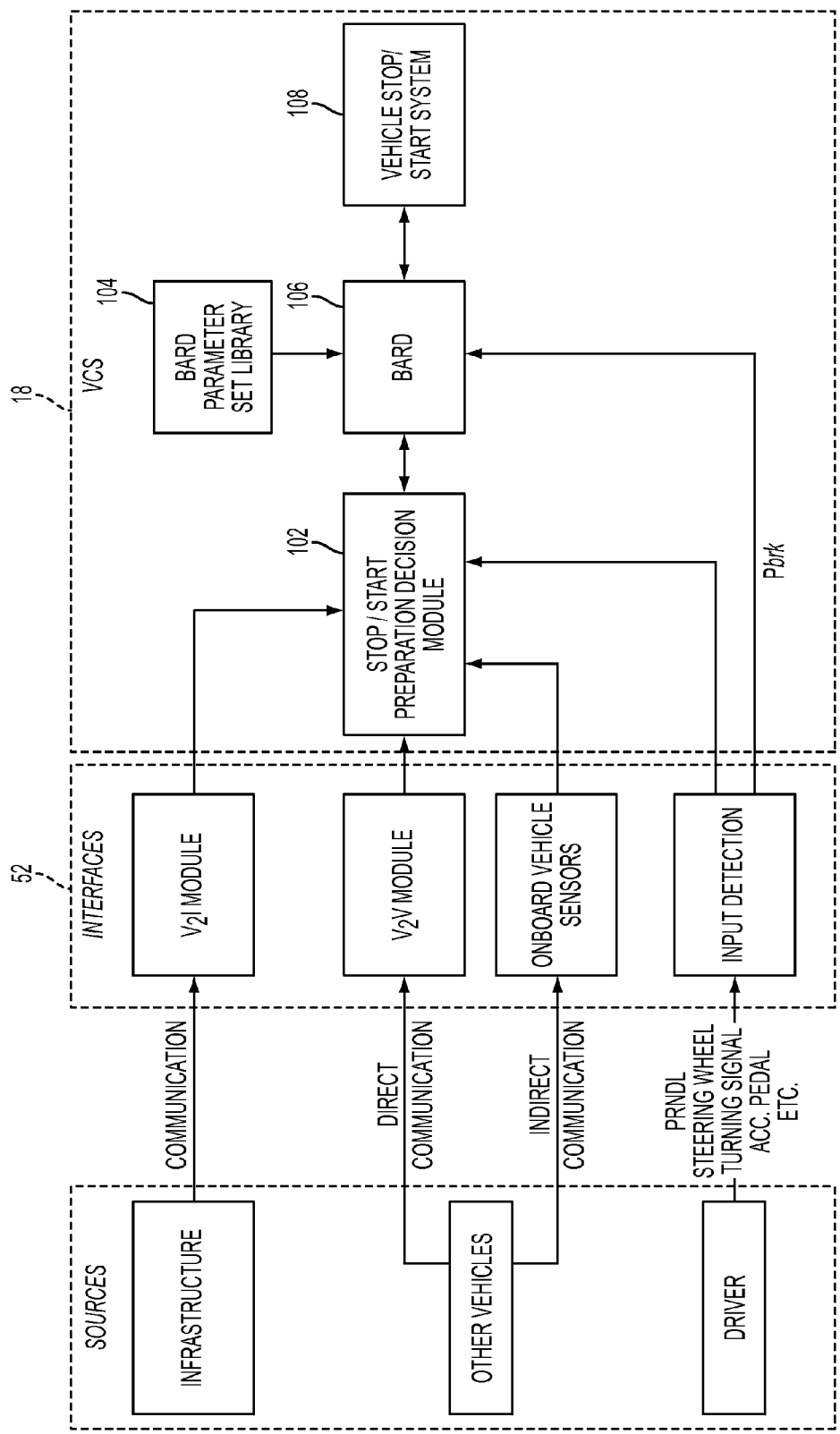
FIG. 2 illustrates an exemplary block diagram of an information-based driver launch intention function architecture.

FIG. 2 illustrates an exemplary block diagram illustrating further aspects of the VSC 18 in communication with additional sources of information for performing driver launch intention interpretation. The interface 52 may provide the vehicle 12 with information regarding infrastructure such as traffic light location and timing, locations of stop signs and other traffic controls, railway crossing locations and train stop timing, as well as indications of special events, such as construction and temporary changes in traffic regulation such as construction zones. The interface 52 may also provide the vehicle 12 with indirect information regarding the environment surrounding the vehicle 12, such as obstacles in the roadway or indications of the state of the vehicles surrounding the vehicle 12, such as whether brake lights or headlamps on other vehicles 12 are visibly engaged. The interface 52 may further provide the vehicle 12 with direct information provided from the vehicle 12 and from other vehicles 12, such as input signals (e.g., $S_{bp}$, $P_{brk}$, engine speed (Ne), vehicle speed, (Veh), steering wheel position, turning signal activation, etc.) from various vehicle sensors of the vehicle 12 itself and/or of other vehicles 12 nearby the vehicle 12.

A stop/start preparation decision module 102 of the VCS 18 may receive information from the interface 52. The stop/start preparation decision module 102 may process the information to determine a level of sensitivity for brake apply and release detection. As one possibility, the stop/start preparation decision module 102 may identify which BARD parameter set 104 from a library of BARD parameter sets 104 should be used for driver stop/start intention interpretation to account for current vehicle 12 circumstances. The indicated parameter set may then be loaded from the library of BARD parameter sets 104. The BARD parameter set library may include pre-calibrated parameter sets 104 suited for different particular brake release sensitivities. As another possibility, the BARD parameter updates may be online-computed parameters determined by applying adaptive adjustments to the current brake apply and release detection thresholds.

The BARD module 106 may be configured to optimize stop/start performance by differentiating between a state in which the driver is not requesting vehicle propulsion, and a state in which the driver is requesting or is about to request vehicle propulsion. The BARD module 106 may be configured to receive a BARD parameter set 104 from the stop/start preparation decision module 102. By monitoring brake pedal brake behavior of a driver of the vehicle (e.g., brake pressure and its gradient indicated by $P_{brk}$), the BARD module 106 may determine, utilizing the BARD parameter set 104, whether the driver is or is expected to request propulsion torque. For example, when a brake release state is determined, the BARD module 106 may be configured to command a stop/start control module 108 of the VCS 18 to request engine start-up to prepare for vehicle launch and acceleration.

Figure 3:
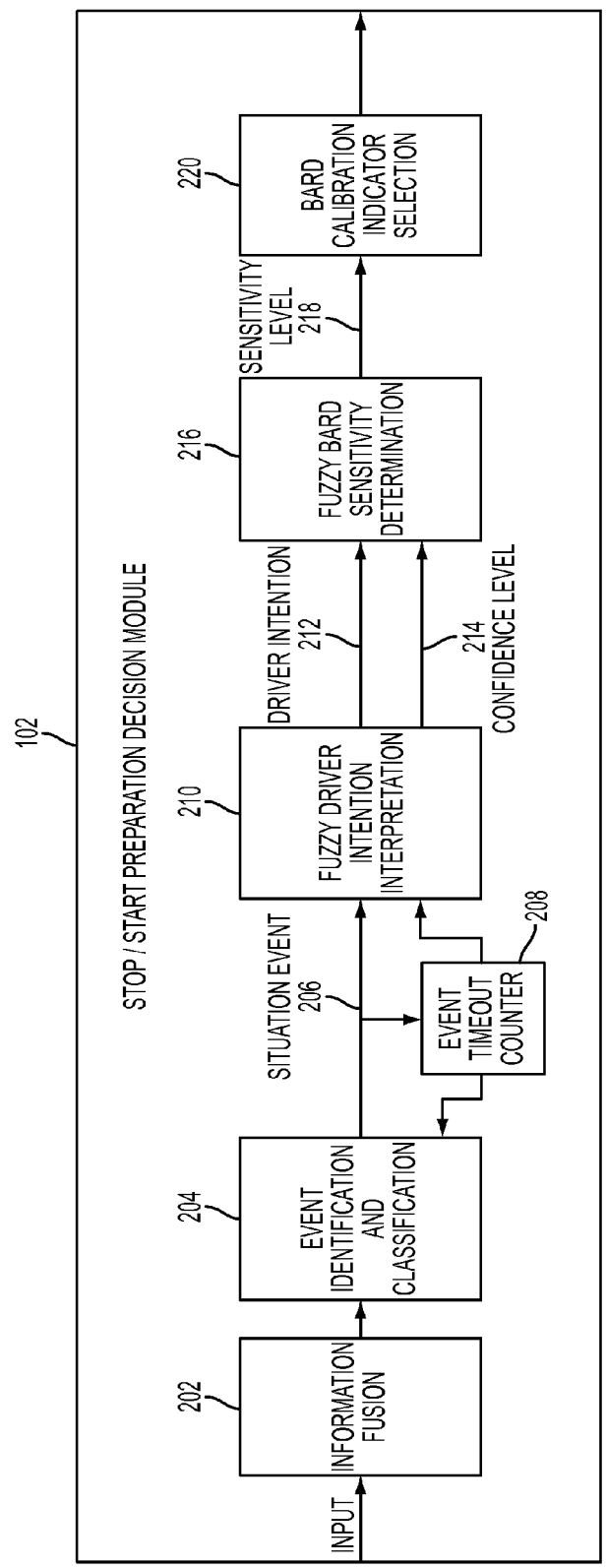
FIG. 3 illustrates an exemplary block diagram of the start/stop preparation decision module of FIG. 2.

FIG. 3 illustrates an exemplary block diagram of the stop/start preparation decision module 102 of FIG. 2. BARD sensitivity control and adjustment may be carried out in the stop/start preparation decision module 102 as shown in FIG. 3. One exemplary modularization of the stop/start preparation decision module 102 may include an information fusion module 202, an event identification module 204, an event timeout counter 208, a fuzzy driver intention interpretation module 210, a fuzzy BARD sensitivity determination module 216, and a BARD calibration indicator selection module 220. It should be noted, however, that the illustrated modularization is merely exemplary, and more, fewer, or different modules may be utilized by the stop/start preparation decision module 102 to perform the functions of the stop/start preparation decision module 102, including, but not limited to the signal processing, event determination, and parameter selection functions.

The information fusion module 202 may be configured to perform collection of input received from various sources. For example, the information fusion module 202 may be configured to collect one or more of the vehicle 12 inputs, infrastructure inputs, direct inputs from other vehicles 12 and indirect inputs from other vehicles 12 discussed above. Due to differences in availability and usefulness of the received information, the information fusion module 202 may be configured to pre-process and synchronize the received inputs for further processing. As one example, the information fusion module 202 may be configured to combine the obtained information into a defined data structure to prepare the information for further use. Moreover, inputs may be associated with timeout, such that older inputs are removed from consideration upon expiration of the associated timeout. In some cases, the timeout may vary according to input source. For instance, an input regarding a red light being present may be associated with a timeout related to the remaining amount of time that the light will remain red, while an input regarding current accelerator (e.g., APP) or brake input (e.g., $P_{brk}$) may have a relatively short timeout value.

The event identification and classification module 204 may be configured to receive the collected information from the information fusion module 202, and use the collected information to determine driving situation events 206 for the vehicle 12. For example, based on available information from infrastructure, surrounding traffic and the driver inputs, the event identification and classification module 204 may be configured to identify a current certain driving situation or current individual driving event 206. The driving situation event 206 may include, as some non-limiting examples, one or more of: (i) a stop in front of a regulated stop site (e.g. a traffic light, a stop sign, a railway crossing, a construction site, etc.) with no vehicle in front; (ii) a stop in front of a regulated stop site after other vehicles; (iii) a stop in front of a moving obstacle (e.g. a pedestrian, an animal, etc.); and (iv) a stop in front of a stationary obstacle (e.g. a wall, a bridge, etc.). The driving event 206 may include, as some non-limiting examples, one or more of: (i) a regulated stop site indicating the vehicle 12 may proceed (e.g., a traffic light turning green, a railway crossing lifting after passing of a train, etc.); (ii) an immediate front vehicle brake release (e.g., indicated by information such as brake lights of the front vehicle 12 being disengaged, notification of engine pull-up of the front vehicle 12, identification of the front vehicle 12 moving forward or backward, etc.); (iii) a driver shift of the shifter 32 from a stop position to an movement position (e.g., from park (P) or neutral (N) to drive (D) or low gear (L)); (iv) a driver initiates a turning signal light (and optionally provides synchronized turning inputs using a steering wheel of the vehicle 12); and (v) an immediate front vehicle 12 remaining relatively stationary and providing little to no forward moving room for the host vehicle 12.

The event identification and classification module 204 may be further configured to categorize the identified driving situations and events 206 into one of a set of standard groups (e.g., stop in front of regulated stop site, stop behind front vehicle, stop with no front vehicle, stop behind railway crossing with no front vehicle, stop by side of road while emergency vehicles pass, go in front of regulated stop site, driver control input indicative of forward movement, etc.). As one possibility, the event identification and classification module 204 may describe the standard groups in a machine-readable language or encoding summarizing the situation and event to prepare the information for further use, such that each of the standard groups is referenced by a unique language identifier. As one possibility, the encoding may include situation elements (e.g., '1' to represent being in front of regulated stop site with no front vehicle, '2' to represent being in front of an obstacle), and event elements (e.g., 'a' to represent a traffic light remaining red, 'b' to represent a traffic light turning green, 'c' to represent a driver shift from park to drive, etc.). Thus, the event identification and classification module 204 may generate a situation and event code "1a" to represent to subsequent functions that the vehicle is in front of a red light with no preceding vehicle. It should be noted that other encodings and representations may be used as well to provide for flexible and comprehensive situation/event interpretation.

The event identification and classification module 204 may be further configured to determine a time threshold to be associated with the event 206 indicative of how long the event 206 should be considered by the stop/start preparation decision module 102 before being removed from consideration. In some cases, the amount of time associated with the event 206 may be determined according to the standard group in which the event 206 is placed. As another possibility, the amount of time may be determined according to properties of the event 206, such as according to the remaining amount of time that a light will remain red. As yet a further possibility, all events 206 may be given substantially the same amount of time to be considered.

The event timeout counter 208 may be configured to count elapsed time associated with the identified events 206, such that each individual event 206 may timeout and be phased out of consideration by the stop/start preparation decision module 102. For example, the event identification and classification module 204 may determine an event 206 indicative of a driver shift from P to D, and may send the event 206 to the fuzzy driver intention interpretation module 210. The event timeout counter 208 may be configured to be notified of the sending of the event 206, and may associate a timer with the event 206, e.g., to start counting time elapsed since the occurrence of the event 206. The timer may further provide feedback to the event identification and classification module 204. When the timer passes a time threshold assigned by the event identification and classification module 204 when generating the event 206 (e.g., according to a standard group with which the event 206 is associated), the indicated event 206 may be removed from consideration. Removal of the event 206 from consideration may be performed, for instance, by the event timeout counter 208 indicating to the event identification and classification module 204 to remove the event 206 from being provided by the outputs of the event identification and classification module 204. When an event 206 has been removed from consideration, the associated timer in the event timeout counter 208 module may be canceled as well.

The fuzzy driver intention interpretation module 210 may be configured interpret the classified driving situation and event information received from the event identification and classification module 204 to predict a driver intention 212. The driver intention 212 may include, for example, a preference of the driver for keeping the vehicle 12 in stop (STOP), an intention to start (START), or a preference for neither stopping nor starting (NORMAL). For example, certain events 206 such as a red light may be indicative of a STOP condition, while other events 206 may be indicative of an intent to start, or may have no impact on the driver intention 212. The fuzzy driver intention interpretation module 210 may be further configured to rank the predicted driver intention 212 according to a likelihood level (e.g., a likelihood level from 1-7 with 1 being relatively less likely and 7 being relatively more likely). This likelihood level may also be referred to as a confidence level 214, and may be provided by the fuzzy driver intention interpretation module 210 to indicate how confident the logic of the fuzzy driver intention interpretation module 210 is in the determination of the driver intention 212 state. Accordingly, the fuzzy driver intention interpretation module 210 may translate the received situations and events into a driver intention 212 preference state (e.g., STOP, START, NORMAL) along with an associated confidence level 214 (e.g., a level from 1-7).

As one example, the fuzzy driver intention interpretation module 210 may interpret a stopped vehicle in park as having a STOP driver intention 212 with a confidence level 214 of '7', as it may be very likely that driver will intend to keep the vehicle stationary in the near future. As another example, the fuzzy driver intention interpretation module 210 may interpret a vehicle stopped in front of a red light with no preceding vehicle as having a STOP driver intention 212 with a lesser confidence level 214, such as '5', as the driver intention interpretation module 210 may still be relatively confident that the driver will intend to keep the vehicle stationary in the near future. However, if a vehicle is stopped in front of red light but with preceding vehicles, the fuzzy driver intention interpretation module 210 may determine a STOP intention with a lower confidence level 214 such as '2', indicating that the driver has a relatively higher possibility to change his mind.

The fuzzy BARD sensitivity determination module 216 may be configured to perform a second level of decision making strategy, and may determine the BARD brake release detection sensitivity level 218 based on the interpreted drive intention 212 and associated confidence level 214. An exemplary BARD performance decision table 400 is illustrated in FIG. 4.

Referring to FIG. 4, when the indicated driver intention 212 is STOP with a confidence level 214 above a first threshold level 402 (e.g., with a confidence level 214 of 6-7 as illustrated), the fuzzy BARD sensitivity determination module 216 may be configured to adjust the BARD sensitivity level 218 with a high sluggishness property, such that brake release detection is more immune to pedal oscillation and unintended driver pedal behavior. As another example, when the indicated driver intention 212 is START with high confidence, the fuzzy BARD sensitivity determination module 216 may be configured to adjust the BARD sensitivity level 218 with a high promptness property, such that driver intention 212 to launch the vehicle 12 may be detected relatively more easily to allow better system response time for the engine startup process. Consequently, the powertrain may be ready for satisfying driver torque requests in preparation for or at the time of vehicle launch. As yet a further example, when the indicated driver intention 212 is NORMAL (i.e., neither STOP nor START), the fuzzy BARD sensitivity determination module 216 may be configured to set or maintain the BARD sensitivity level 218 at a default sensitivity level 218 optimized for normal driving situations and common drivers.

When the confidence level 214 is not above the first threshold level 402 but is above a second threshold level 404 (e.g., with a confidence level 214 of 3-5 as illustrated), the fuzzy BARD sensitivity determination module 216 may be configured to adjust the sensitivity level 218 toward either sluggishness or promptness as described above, but in a relatively milder manner (i.e., with a smaller adjustment from default settings). When the confidence level 214 is below the second threshold level 404 (e.g., with a confidence level 214 of 1-2 as illustrated), the fuzzy BARD sensitivity determination module 216 may not take action with respect to adjustments to the sluggishness or promptness of the start/stop system, and may elect to utilize default settings (e.g., corresponding to the default sensitivity level 218).

Returning to FIG. 3, the BARD calibration indicator selection module 220 may be configured to, based on the BARD sensitivity level 218 determined by the BARD sensitivity determination module 216, associate the indicated sensitivity level 218 with a set of BARD calibration parameter values. These BARD calibration parameter values may include thresholds on brake pressure and its gradient to characterize driver brake pedal behavior, including, for example, a first brake pedal pressure threshold value at which the engine is shutdown or "pulled-down", and a second brake pressure threshold value at which the engine is started or "pulled-up." Different sets of BARD parameter values may be pre-calibrated to embody different sensitivity characteristics, ranging from a low sensitivity level 218 that is relatively immune to pedal oscillation and unintended driver pedal behavior, to a high sensitivity level 218 that is relatively more responsive to allow better system response time for the engine startup process (e.g., high sluggishness, medium sluggishness, default settings, medium promptness, high promptness, etc.). The BARD calibration indicator selection module 220 may be configured to apply the appropriate set of BARD parameter values to be used by the vehicle 12 in monitoring of the driver brake behavior.

Figure 5:
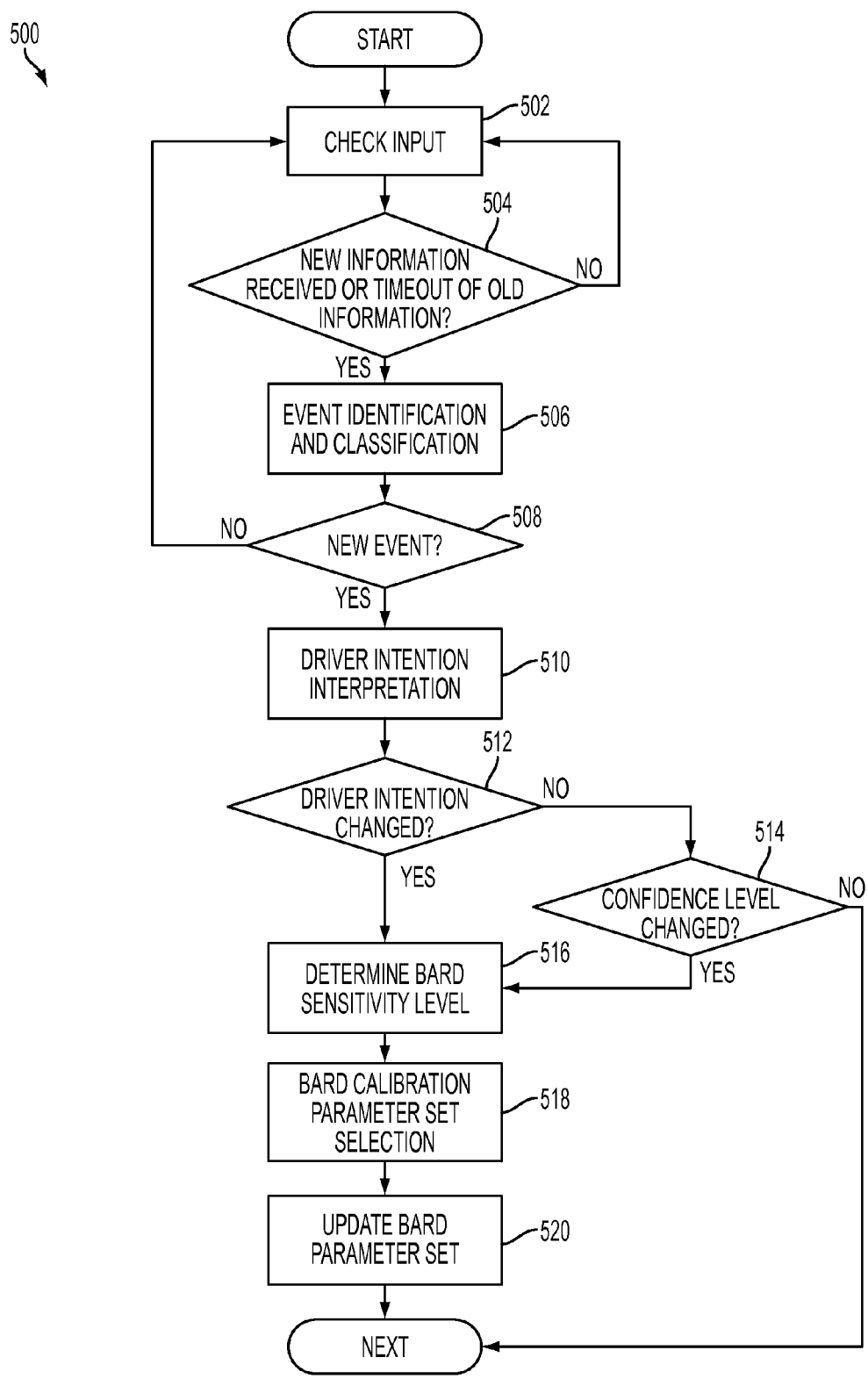
FIG. 5 illustrates an exemplary process for controlling engine shutdown and restart using engine start/stop sensitivity control of brake apply and release detection.

FIG. 5 illustrates an exemplary process 500 for controlling engine shutdown and restart using engine start/stop sensitivity control of brake apply and release detection. The process 500 may be performed, for example, by a VCS 18 of the vehicle 12 utilizing a stop/start preparation decision module 102.

At block 502, the VCS 18 checks for new inputs. For example, the information fusion module 202 of the stop/start preparation decision module 102 may be configured to perform collection of input received from various sources one or more of the vehicle 12 inputs, infrastructure inputs, direct inputs from other vehicles 12 and indirect inputs from other vehicles 12.

At decision point 504, the VCS 18 determines whether new information was received or whether existing information has timed out. For example, if new inputs have been received by the information fusion module 202, the information fusion module 202 may be configured to pre-process and synchronize the received inputs for further processing (e.g., by the event identification and classification module 204 of the stop/start preparation decision module 102). As another example, if older inputs have been received by the information fusion module 202 over a predetermined threshold amount of time ago, these older events 206 may be removed from inclusion in the pre-processed inputs according to the event timeout counter 208 of the stop/start preparation decision module 102. If new information was received or if existing input has timed out, control passes to block 506. Otherwise, control passes to block 502.

At block 506, the VCS 18 performs event identification and classification. For example, the event identification and classification module 204 may be configured to receive the information from the information fusion module 202, and use the received information to determine driving situations and events 206 regarding the vehicle 12 and its surroundings. The event identification and classification module 204 may be further configured to categorize the identified driving situations and events 206 into a standard group, as well as to determine a time threshold to be associated with the event 206 indicative of how long the event 206 should be considered by the stop/start preparation decision module 102 before being removed from consideration.

At decision point 508, the VCS 18 determines whether a new event 206 was identified. As one example, the event identification and classification module 204 may determine one or more new driving situations and events 206 regarding the vehicle 12. As another example, the event identification and classification module 204 may determine, according to the event timeout counter 208, that one or more events 206 previously identified by the event identification and classification module 204 have timed out and should be phased out of consideration by the stop/start preparation decision module 102. If the VCS 18 determines that one or more new event 206 have been identified, or that one or more existing events 206 have been removed, control passes to block 510. Otherwise, control passes to block 502.

At block 510, the VCS 18 performs driver intention 212 interpolation. For example, the fuzzy driver intention interpretation module 210 of the stop/start preparation decision module 102 may be configured interpret the classified driving situation and event 206 information received from the event identification and classification module 204 to predict driver preference for keeping the vehicle 12 in stop (STOP), intending to start (START), or that the inputs have no impact (NORMAL) on driver intention 212. The fuzzy driver intention interpretation module 210 may further determine a confidence level 214 indicative of how likely the interpreted driver intention 212 is predicted to occur.

At decision point 512, the VCS 18 determines whether the vehicle driver intention 212 has changed. For example, based on the determination made by the fuzzy driver intention interpretation module 210, the VCS 18 may determine whether the driver intention 212 has changed (e.g., from START to STOP, from STOP to START, from STOP to NORMAL, etc.). If the driver intent has changed, control passes to block 516. Otherwise, control passes to decision point 514.

At decision point 514, the VCS 18 determines whether the confidence level of the determination of the vehicle driver intention has changed. For example, based on the determination made by the fuzzy driver intention interpretation module 210, the VCS 18 may determine that, while the driver intention 212 has not changed, the current confidence level 214 differs from the previously determined confidence level 214. If so, control passes to block 516. Otherwise, as the driver intention 212 and confidence level 214 remain unchanged, control passes to block 502 for a next iteration of the process 500.

At block 516, the VCS 18 determines a BARD sensitivity level 218. For example, the fuzzy BARD sensitivity determination module 216 of the stop/start preparation decision module 102 may be configured to perform a second level of fuzzy decision making strategy, and may utilize the BARD performance decision table 400 to determine a new BARD brake release detection sensitivity level 218 based on the interpreted drive intention 212 and associated confidence level 214. An exemplary BARD performance decision table 400 is illustrated in FIG. 4.

At block 518, the VCS 18 selects a BARD calibration parameter set 104. For example, the BARD calibration indicator selection module 220 of the stop/start preparation decision module 102 may be configured to identify a set of BARD calibration parameter values based on the BARD sensitivity level 218 determined by the BARD sensitivity determination module 216. As one possibility, the stop/start preparation decision module 102 may identify which pre-calibrated BARD parameter set 104 from a library of BARD parameter sets 104 is associated with the determined sensitivity level 218. The indicated parameter set 104 may accordingly be loaded from the library of BARD parameter sets 104 by the VCS 18. As another possibility, the VCS 18 may compute BARD parameter updates corresponding to the sensitivity level 218 by applying adaptive adjustments to the current brake apply and release detection thresholds.

At block 520, the VCS 18 updates the BARD calibration parameter set utilized by the vehicle 12. For example, the BARD calibration indicator selection module 220 may be configured to apply the loaded or calculated parameter set 104 to be used by the vehicle 12 in monitoring of the driver brake input $P_{brk}$. After block 522, control passes to block 502 for a next iteration of the process 500. Variations on the process 500 are possible. For example, the decision points 512, 514 and 516 may be omitted, and control may pass from block 510 to block 518.

By adjusting the sensitivity 218 of brake release detection using additional information from sources external to the vehicle 12, the VCS 18 may provide a more accurate identification of driver intention 212 with respect to vehicle propulsion demand and launch performance. Thus, the VCS 18 of a vehicle 12 may provide adaptive BARD brake release detection sensitivity according to driving situations and events 206, such that the best tradeoff between robustness and promptness may be used in the determination of driver intention 212 of vehicle propulsion.

As one example, a VCS 18 of a vehicle 12 may utilize the information fusion module 202 to detect that the vehicle 12 is stopped in front of a traffic light and that no front vehicle detected by vehicle 12 Radar/Lidar. The event identification and classification module 204 may determine that the traffic light will turn green, e.g., according to information received from the infrastructure via the interface 52, and may generate an event 206 in a standard group of go in front of regulated stop site. The fuzzy driver intention interpretation module 210 may interpret the event 206 information to indicate a driver intention 212 of START with a high confidence level 214. Consequently, the fuzzy BARD sensitivity determination module 216 may select a relatively high sensitivity level 218. The BARD calibration indicator selection module 220 may accordingly adjust the BARD calibration to monitor driver brake input $P_{brk}$ according to a parameter set 104 associated with the relatively high sensitivity level 218.

As another example, a VCS 18 of a vehicle 12 may utilize the information fusion module 202 to detect that the host vehicle 12 is stopped in front of a traffic light but that there is a front vehicle 12. As compared to the previous example, the fuzzy driver intention interpretation module 210 may interpret the generated events 206 to indicate a driver intention 212 of START with low-medium confidence level 214 before any front vehicle state change is identified (e.g. brake light off on front vehicle, forward movement of front start vehicle, engine state turns to running, etc.), because the likelihood of vehicle 12 launch depends on movement of the front vehicle 12. The fuzzy BARD sensitivity determination module 216 may accordingly select a default sensitivity level 218 or a slightly more sensitive sensitivity level 218. The BARD calibration indicator selection module 220 may adjust the BARD calibration to monitor driver brake input $P_{brk}$ according to a parameter set 104 associated with selected sensitivity level 218.

As a third example, a VCS 18 of a vehicle 12 may utilize the information fusion module 202 to detect that the vehicle 12 is stopped in front of a railroad crossing, with substantial time left before gate opening and with no front vehicle. The fuzzy driver intention interpretation module 210 may interpret the event 206 information to indicate a driver intention 212 of STOP with a high confidence level 214. Accordingly, the fuzzy BARD sensitivity determination module 216 may select a low sensitivity level 218, since it is very unlikely that the driver will request vehicle propulsion in the next several minutes. The BARD calibration indicator selection module 220 may adjust the BARD calibration to monitor driver brake input $P_{brk}$ according to a parameter set 104 associated with the selected low sensitivity level 218.

As a fourth example, a VCS 18 of a vehicle 12 may utilize the information fusion module 202 to detect that the vehicle 12 is stopped with a right turn signal on and no front vehicle 12. As the turn signal indicates driver intention 212 to perform a right turn when traffic is clear, the fuzzy BARD sensitivity determination module 216 may select a parameter set 104 associated with a default sensitivity level 218 or a slightly more sensitive sensitivity level 218. The BARD calibration indicator selection module 220 may adjust the BARD calibration to monitor driver brake input $P_{brk}$ according to a parameter set 104 associated with selected sensitivity level 218.

As a fifth example, a VCS 18 of a vehicle 12 may utilize the information fusion module 202 to detect that the vehicle 12 is stopped, and is shifted from neutral (N) or park (P) to a drive gear such as drive (D) or low gear (L). As the driver shifting into gear is highly indicative of a vehicle launch, the fuzzy BARD sensitivity determination module 216 may select a parameter set 104 associated with a high sensitivity level 218. The BARD calibration indicator selection module 220 may adjust the BARD calibration to monitor driver brake input $P_{brk}$ according to a parameter set 104 associated with selected high sensitivity level 218.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid vehicle comprising:
   an engine configured for automatic shutdown and restart; and
   a controller configured to
      adjust a brake apply and release detection calibration based on a brake detection sensitivity level associated with a predicted driver start/stop intention for the vehicle and a confidence level indicative of a likelihood of the predicted driver intention derived from classified driving situation and event information, the calibration including a first brake pedal pressure threshold value at which the engine is shutdown, and a second brake pressure threshold value at which the engine is started; and
      perform at least one of startup of the engine and shutdown of the engine according to the adjusted brake pedal calibration.

2. The vehicle of claim 1, wherein the predicted driver intention is based on at least one of information received from road infrastructure, information received from nearby vehicles, and information received from driver inputs other than brake pedal input.

3. The vehicle of claim 1, wherein the predicted driver intention includes one of a preference for keeping the vehicle in stop, a preference for starting the vehicle, or neither a preference keeping the vehicle in stop nor a preference for starting the vehicle.

4. The vehicle of claim 1, wherein the controller is further configured to at least one of:
   (i) when the predicted driver intention indicates a preference for keeping the vehicle in stop, decrease the sensitivity level of the brake apply and release detection calibration as the confidence level increases; and (ii) when the predicted driver intention indicates a preference for starting the vehicle, increase the sensitivity level of the brake apply and release detection calibration as the confidence level increases.

5. The vehicle of claim 1, wherein the controller is further configured to adjust the brake apply and release detection calibration by retrieving a predefined detection calibration associated with the sensitivity level.

6. The vehicle of claim 1, wherein the controller is further configured to adjust the brake apply and release detection calibration to default settings if at least one of (i) the confidence level is below a threshold level and (ii) the predicted driver intention is neither a preference keeping the vehicle in stop nor a preference for starting the vehicle.

7. A hybrid vehicle method comprising:
adjusting a brake apply and release detection calibration by a vehicle controller based on a brake detection sensitivity level associated with a predicted driver start/stop intention for the vehicle and a confidence level indicative of a likelihood of the predicted driver intention derived from classified driving situation and event information; and
performing at least one of engine startup and engine shutdown according to the adjusted brake pedal detection calibration.

8. The method of claim 7, wherein the predicted driver intention is based on at least one of information received from road infrastructure, information received from nearby vehicles, and information received from driver inputs other than brake pedal input.

9. The method of claim 7, wherein the predicted driver intention includes one of a preference for keeping the vehicle in stop, a preference for starting the vehicle, or neither a preference keeping the vehicle in stop nor a preference for starting the vehicle.

10. The method of claim 7, further comprising at least one of:
(i) when the predicted driver intention indicates a preference for keeping the vehicle in stop, decreasing the sensitivity level of the brake apply and release detection calibration as the confidence level increases; and
(ii) when the predicted driver intention indicates a preference for starting the vehicle, increasing the sensitivity level of the brake apply and release detection calibration as the confidence level increases.

11. The method of claim 7, further comprising adjusting the brake apply and release detection calibration by retrieving a predefined detection calibration associated with the sensitivity level.

12. The method of claim 7, further comprising adjusting the brake apply and release detection calibration to default settings if at least one of (i) the confidence level is below a threshold level and (ii) the predicted driver intention is neither a preference keeping the vehicle in stop nor a preference for starting the vehicle.

13. The method of claim 7, wherein the calibration includes a first brake pedal pressure threshold value at which an engine of the vehicle is shutdown, and a second brake pressure threshold value at which the engine of the vehicle is started.

14. A hybrid vehicle powertrain control system comprising:
at least one controller configured to
adjust a brake apply and release detection calibration based on a brake detection sensitivity level associated with a predicted driver start/stop intention for a vehicle and a confidence level indicative of a likelihood of the predicted driver intention derived from classified deriving situation and event information; and
performing at least one of engine startup and engine shutdown according to the adjusted brake pedal calibration.

15. The powertrain control system of claim 14, wherein the predicted driver intention is based on at least one of information received from road infrastructure, information received from nearby vehicles, and information received from driver inputs other than brake pedal input.

16. The powertrain control system of claim 14, wherein the predicted driver intention includes one of a preference for keeping the vehicle in stop, a preference for starting the vehicle, or neither a preference keeping the vehicle in stop nor a preference for starting the vehicle.

17. The powertrain control system of claim 14, wherein the controller is further configured to at least one of:
(i) when the predicted driver intention indicates a preference for keeping the vehicle in stop, decrease the sensitivity level of the brake apply and release detection calibration as the confidence level increases; and
(ii) when the predicted driver intention indicates a preference for starting the vehicle, increase the sensitivity level of the brake apply and release detection calibration as the confidence level increases.

18. The powertrain control system of claim 14, wherein the controller is further configured to adjust the brake apply and release detection calibration by retrieving a predefined detection calibration associated with the sensitivity level.

19. The powertrain control system of claim 14, wherein the controller is further configured to adjust the brake apply and release detection calibration to default settings if at least one of (i) the confidence level is below a threshold level and (ii) the predicted driver intention is neither a preference keeping the vehicle in stop nor a preference for starting the vehicle.

20. The powertrain control system of claim 14, wherein the calibration includes a first brake pedal pressure threshold value at which an engine of the vehicle is shutdown, and a second brake pressure threshold value at which the engine of the vehicle is started.

* * * * *